(12) United States Patent
Dean (10) Patent No.: US 10,169,711 B1
(45) Date of Patent: Jan. 1, 2019

(54) GENERALIZED ENGINE FOR PREDICTING ACTIONS

(71) Applicant: Google LLC, Mountain View, CA (US)

(72) Inventor: Jeffrey A. Dean, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 65 days.

(21) Appl. No.: 15/277,306

(22) Filed: Sep. 27, 2016

Related U.S. Application Data (63) Continuation of application No. 13/928,939, filed on Jun. 27, 2013.

(51) Int. Cl.
| | | |
|---|---|---|
| *G06F 7/00* | (2006.01) | |
| *G06F 17/30* | (2006.01) | |
| *G06N 7/00* | (2006.01) | |
| *H04L 29/08* | (2006.01) | |
| *G06F 21/62* | (2013.01) | |

(52) U.S. Cl.
CPC ....... *G06N 7/005* (2013.01); *G06F 17/30864* (2013.01); *G06F 21/6218* (2013.01); *H04L 67/02* (2013.01); *H04L 67/142* (2013.01)

(58) Field of Classification Search
CPC ....... G06Q 10/10; H04L 29/06; H04L 12/581; G06F 7/10; G06F 7/20
USPC ........................................................ 709/204
See application file for complete search history.

(56) References Cited

U.S. PATENT DOCUMENTS

| | | | | |
|---|---|---|---|---|
| 6,678,791 B1 * | 1/2004 | Jacobs | ............. | G06F 17/30902 709/203 |
| 7,917,480 B2 | 3/2011 | Dean et al. | | |
| 8,180,892 B2 * | 5/2012 | Deridder | ................. | H04L 67/22 370/231 |
| 8,209,331 B1 * | 6/2012 | Garg | ................. | G06F 17/30067 707/734 |
| 8,972,391 B1 * | 3/2015 | McDonnell | ......... | G06F 17/3053 707/727 |
| 2001/0049674 A1 * | 12/2001 | Talib | ................. | G06F 17/30622 |
| 2002/0123988 A1 * | 9/2002 | Dean | ................. | G06F 17/30864 |
| 2002/0198882 A1 * | 12/2002 | Linden | ............. | G06F 17/30867 |
| 2004/0215607 A1 * | 10/2004 | Travis, Jr. | ......... | G06F 17/30864 |
| 2005/0010564 A1 * | 1/2005 | Metzger | ............ | G06F 17/30339 |

(Continued)

OTHER PUBLICATIONS

Barroso et al., "Web Search for a Planet: The Google Cluster Architecture," IEEE Mirco, Mar.-Apr. 2003, pp. 22-28.

*Primary Examiner* — Esther B. Henderson
*Assistant Examiner* — Golam Mahmud
(74) *Attorney, Agent, or Firm* — Fish & Richardson P.C.

(57) ABSTRACT

Methods, systems, and apparatus, including computer programs encoded on computer storage media, for predicting actions based on large-scale aggregations of data. One of the methods includes obtaining user activity data organized into sessions, the user activity data representing user activities, each session including one or more user activities for a particular user, the sessions including sessions for multiple users; receiving a session query, the session query including a query term representing a query activity; identifying matching sessions, the matching sessions each satisfying the session query; identifying likely activities in the matching sessions, likely activities being activities found in the matching sessions that satisfy the session query and occur in the matching sessions more frequently than in sessions in general; and identifying one or more of the likely activities in a response to the session query.

18 Claims, 7 Drawing Sheets

(56) References Cited

U.S. PATENT DOCUMENTS

| | | | |
|---|---|---|---|
| 2006/0036593 A1 | 2/2006 | Dean et al. | |
| 2006/0287096 A1* | 12/2006 | O'Kelley, II | A63F 13/12 463/42 |
| 2007/0220023 A1* | 9/2007 | Dean | G06F 17/30613 |
| 2008/0104045 A1* | 5/2008 | Cohen | G06F 17/30528 |
| 2008/0250026 A1* | 10/2008 | Linden | G06F 17/30867 |
| 2010/0217879 A1* | 8/2010 | Weiner | H04L 41/12 709/228 |
| 2011/0040733 A1* | 2/2011 | Sercinoglu | G06Q 30/02 707/688 |
| 2011/0289068 A1* | 11/2011 | Teevan | G06F 17/30867 707/709 |
| 2013/0060868 A1* | 3/2013 | Davis | G06Q 10/107 709/206 |
| 2013/0061333 A1* | 3/2013 | Davis | H04L 63/0861 726/28 |
| 2013/0325667 A1* | 12/2013 | Satyavolu | G06Q 30/0201 705/26.64 |

\* cited by examiner

| Activity ID | Count of matching sessions with the activity | Total count of sessions with the activity | Inclusive-OR of user keys | |
|---|---|---|---|---|
| Activity ID A 502a | Session count A 504a | Total count A 506a | User keys A 508a | ← 510 |
| ... | ... | ... | ... | |
| Activity ID N 502n | Session count N 504n | Total count N 506n | User keys N 508n | |

GENERALIZED ENGINE FOR PREDICTING ACTIONS

CROSS REFERENCE TO RELATED APPLICATIONS

This application is a continuation of and claims priority to U.S. patent application Ser. No. 13/928,939, filed on Jun. 27, 2013, the entire contents of which are hereby incorporated by reference.

BACKGROUND

This specification relates to using computer-implemented techniques to predict actions of people interacting with data processing systems, in particular, large scale systems, for example, web search systems and social network systems.

SUMMARY

This specification describes techniques for predicting user actions based on large-scale aggregations of data. Systems implementing these techniques can make useful predictions.

In general, one innovative aspect of the subject matter described in this specification can be embodied in methods that include the actions of obtaining user activity data organized into sessions, the user activity data representing user activities, each session containing one or more user activities for a particular user, the sessions including sessions for multiple users; receiving a session query, the session query including a query term representing a query activity; identifying matching sessions, the matching sessions each satisfying the session query; identifying likely activities in the matching sessions, likely activities being activities found in the matching sessions and occurring in the matching sessions more frequently than in sessions in general; and identifying one or more of the likely activities in a response to the session query.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment may include all the following features in combination. The user activity data includes data representing user interests. Some of the sessions include one or more respective user interests. The sessions for each user are non-overlapping in time. Each of the user interests is represented by a unique entity identifier. The sessions each cover a period of time of a predetermined duration. The predetermined duration is 48 hours or longer. The number of sessions is greater than $1 \times 10^9$ sessions. The number of users is greater than $5 \times 10^6$ users. The user activity data the user activity data is partitioned into sessions and each partition is stored in a shard on a leaf server in a cluster of servers that has at least 50 or 100 leaf servers.

The subject matter described in this specification can be implemented in particular systems so as to realize one or more of the following advantages. Accurate user action prediction can be made because a system can make available a large amount of labeled data for analysis. A system can provide a wide variety of prediction services for its users. A system can predict most likely subsequent queries given a prior query. For example, a sorted list of adjacent queries can be provided, using a distance metric. A system can recommend, for example, that a user take a specific action, when the system determines that users with certain characteristics do take the action. A system can identify correlated activities for users who have demonstrated interest in a particular topic, or correlated activities for a same day when a user submits a particular query or visits a particular web page. A system can predict queries, resources, locations, geographic entities, interests, high level task labels, and other properties of interest present in the stored session data based on correlated activities.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes, among other things, a general purpose action prediction engine. The prediction engine can combine user activity data from a variety of search system sources while preserving session chronology, and non-personally identifiable user labels and demographic information. Certain user activity data may be treated in one or more ways before it is stored or used, so that personally identifiable information is removed. The user activity data is from within a limited period of time. The prediction engine aggregates individual data dynamically to produce correlations concerning user interests, locations, specific products and/or services, ad clicks, news clicks, URL clicks, purchase information, and so on. To ensure sufficiently large numbers of users are represented by each produced correlation, the analysis software ensures that each correlation represents aggregated activity of at least K unique users. The prediction engine can also use higher-level annotations, e.g., the user seems to be involved in the 'plan a trip to Tahiti' task, associated with lower-level actions, e.g., the user has submitted searches directed to flights to, and hotels in, Tahiti. All of this combined data is then indexed with a very large number of features. This enables varied and extensive querying of the data to find useful correlations.

While the prediction engine can improve personalization, it does not rely on a personal per-user model. Instead, the prediction engine provides information based on aggregated user actions. If, for instance, the prediction engine recommends that a user take a specific action, it is because the prediction engine has observed, based on aggregated user data, that a user with certain characteristics is more likely to take the action than are users in general.

Figure 1:
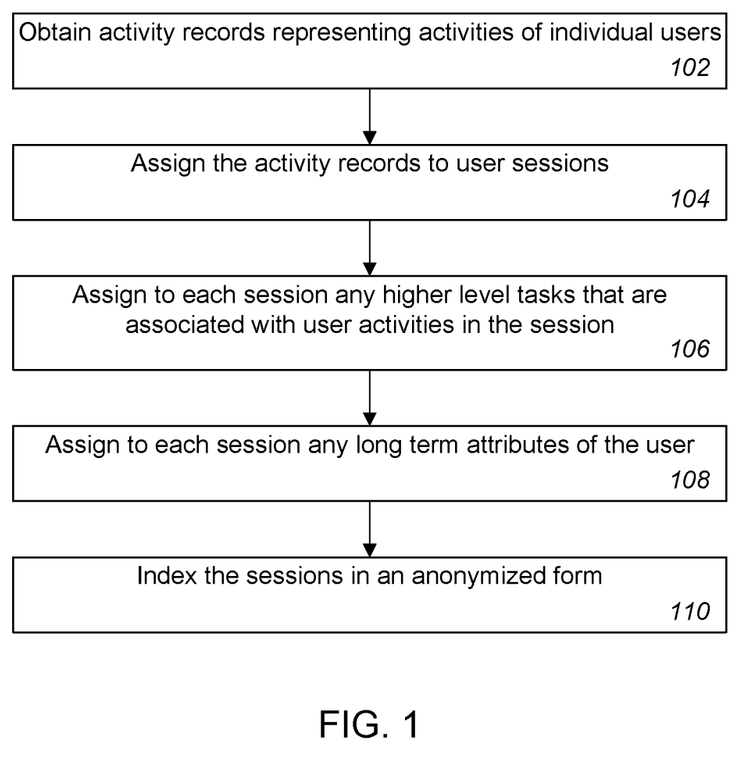
FIG. 1 is a flowchart of an example process for building a session index for use by a prediction engine.

FIG. 1 is a flowchart of an example process for building a session index for use by a prediction engine. For convenience, the process will be described as being performed by an indexing system of one or more computers located in one or more locations.

The system obtains activity records representing activities of individual users, including the times at which the activities occurred (102). An activity can be any action performed by a user, or on behalf of a user, on any interactive system, e.g., a web search system, an image search system, a map system, an e-mail system, a social network system, a blogging system, a shopping system, just to name a few. An activity can also be an action directed to a user, e.g., a receipt of an e-mail message, or a higher-level task. An activity can also be a status, e.g., that a user has an interest in film noir.

The indexing system can be an integral part of an interactive system, or it can be a separate system that obtains activity data from one or more interactive systems. The user may be a registered user of the system whose activities can for that reason be distinguished from the activities of other users. In some implementations, the user may be any distinguishable source of activity, whether or not a particular individual. In some implementations, a user may be distinguished by, e.g., signed-in user identifier; an anonymous cookie, which identifies a particular Web browser but not necessarily a particular individual; an IP (Internet Protocol) address, which identifies a particular source of traffic on a network, but not necessarily a particular browser or individual; or by some other identifying information. In some implementations, users may be distinguished by the IP addresses of the user devices used in performing the activities. In some implementations, a user or group of users may be distinguished from other users by reference to the IP address of the user devices used in performing the activities. Multiple individuals may share IP addresses, or the activity of one individual may come from multiple IP addresses over time. In some implementations, other techniques such as signed-in user identifiers or anonymous cookies may additionally be used to distinguish between sources of activity. In some implementations, activities are recorded by the interactive system involved in the activity. In some implementations, activity information is also, or alternatively, collected by an application, e.g, a web browser toolbar, running on the user's device.

A user action can be, for example, the submission of a particular query; the selection, in response to a particular query, of a particular search result, or of any search result; a visit, or a long visit, to a particular web site, page, or image; the viewing of a video; the submission of a request for directions to a point of interest; the receipt of a message confirming a hotel, flight, or restaurant reservation, or confirming purchase of a particular product or kind of product, or of a particular service or kind of service.

An activity record can include further information about the activity, for example, a location, a time of day, a day of week, a date, or a season of the activity, for example. The location can be obtained from a location obtained from a user device used to interact with the interactive system or from a service provider, e.g., a mobile telephone network, or it can be inferred, for example, from an IP address of the user device. The location can be recorded in a generalized form using identifiers of one or more quadrilaterals in a predetermined geographic grid.

In some cases, activities can be associated with entities, in particular, with real world people, places, things, both tangible and intangible. For example, a search system could determine that a particular query is about a particular city, and the indexing system could then associate a globally unique identifier for the city with the query in the activity record. Similarly, a shopping system or an e-mail system could determine that a user has purchased a particular product or service, associate that with a particular entity and a unique identifier for the product or service entity, and include that information in the corresponding activity record. The entities associated with the activities of a user can be treated as likely interests of the user at the time of the activity.

The system assigns the activity records to user sessions (104). In some implementations, the sessions are defined as non-overlapping periods of a fixed length, e.g., one, two, three, five, seven, or ten days, or as overlapping periods of fixed length, in which case some activities could appear in more than one session. In some implementations, all sessions of all users are aligned to start and end on the same schedule. For convenience, the session may be said to "contain" activity records or, for brevity, to "contain" activities; similarly, an activity or an activity record may be said to be "found in" a session. In some implementations, each session is represented by a separate document that includes activity records, described below, as segments of text. Thus, according to context, the term "session" can also refer to the collected activity records assigned to a session, or a document representing the session.

The system optionally assigns to each session activity records representing any higher-level tasks that are associated with user actions that occurred during the time of the session (106), if higher-level task information is available. For example, an interactive system may associate a higher-level task with the occurrence of user activities of particular kinds within time windows of a predetermined length, which would be independent of length of sessions, described above. For example, when an interactive system sees a user submit multiple search queries naming vacation destinations, the interactive system may identify a "plan a vacation" task and associate it with each of the queries. If the queries are localized, a more specific task may be identified, e.g., "plan a vacation in Europe" or "plan a vacation in Italy." If such associated task information is available for activities in a session, the indexing system can associate the available task information with the session.

The system assigns to each session activity records representing any long-term attributes of the user (108) known to the system. Long-term attributes can include, for example, a preferred language or languages, a home city, a gender, an age, a marital status, or other user profile information provided by the user to the system or affiliated system. Some interactive systems maintain data representing users' long-term interests, for example, basketball, basket weaving, or classical music. If such long-term interest information is available, the long-term attributes can include such long-term interests.

Each session can be represented as a collection of activity records.

In some implementations, each session is represented as a chronological sequence of activity records. Those records having no associating time can be placed at any convenient place in the sequence, e.g., at the beginning of the sequence. The remaining records are placed in time order. The time assigned to a higher-level task can be the time of the first action associated with the task.

The activity records can be structured in any convenient form. In some implementations, the activity records are keyword-value pairs. Keywords can include, for example, keywords for the selection of a service, e.g., a search engine, a map service, a blog service, a social network service; keywords for the submission of a query or other request or a selection of content to the most recently selected service; keywords for the receipt of content from the most recently selected service; keywords for the viewing of particular content; keywords for tasks; or keywords for long-term attributes. The values can include, for example, text strings, locally unique identifiers, or globally unique identifiers, e.g., entity identifiers obtained from a semantic knowledge base.

The system indexes the sessions in an anonymized form (110). To protect user privacy, user session information is used by the prediction engine only in its anonymized form. The steps taken to index the sessions in an anonymized form will be described below. The index can be an inverted index, e.g., one in which there is a posting list for each term in an index dictionary. Each dictionary term can represent an activity, attribute, or any other feature of a session that may be useful. The posting list provides, for each dictionary term, a list of sessions in which the term appears, and optionally further information, e.g., where in the session the term appears, if the term has a specific location within the session.

A session is associated with a user by a user identifier that is unique to each user that the system can distinctly identify. A particular small portion of this unique user identifier, e.g., 6, 8, 10, or 12 bits, is taken and mapped to set a single bit of a user key. The mapping can be done by hashing the small portion to a number that selects one bit of the user key, which the system sets. The user key is an m-bit value, of which only one bit is set. The size m can be any value that is convenient in the underlying computer architecture, e.g., 32, 48, 64, 96, or 128. Thus, the user of each indexed user session is identified in the index by a user key that is shared by many other users.

Figure 2:
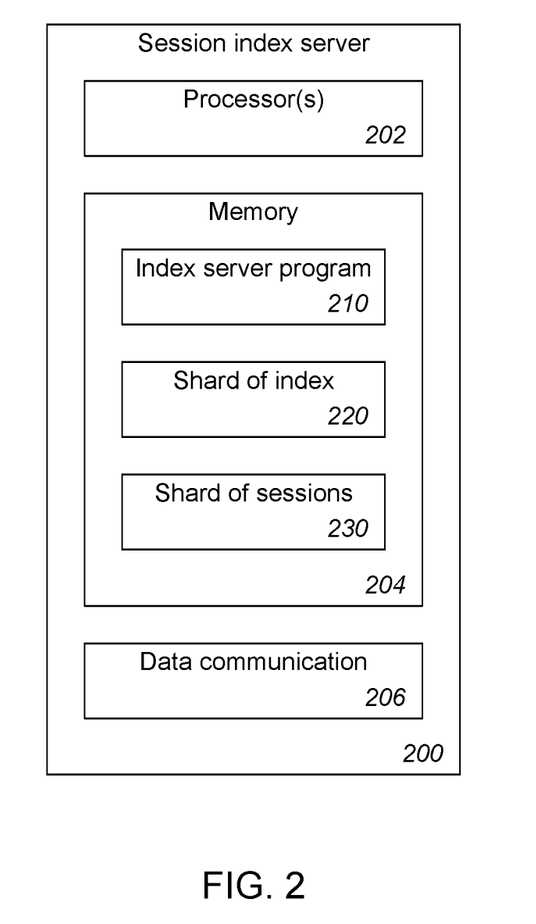
FIG. 2 illustrates a session index server.

FIG. 2 illustrates a session index server 200. The system uses a cluster of such index servers to store and query the session index. The session index is partitioned into shards that are stored on multiple index servers in the cluster. The sessions themselves are partitioned in parallel into shards and stored on the same index servers as the corresponding index shards, or on a corresponding structure of session servers. Each index server has a processor or processors 202, which can be a single processor, a multi-core processor, or multiple such processors. To support the processing of queries in parallel by the server, it is advantageous to select processor architectures that support parallelism, e.g., simultaneous multithreading or on-chip multiprocessors. Each index server has memory 204 for storing data and programs. The memory can be semiconductor memory, e.g., DRAM (dynamic random-access memory) or flash memory or a combination of them. Each index server can also have disk memory. Each index server also has data communication hardware and software 206 for communicating with other computers over a network or other data communication infrastructure.

Each index server has in its memory 204 the shard of the session index 220 and the shard of the sessions 230 that are assigned to the server. In some implementations, a server has two or more shards of the session index and the sessions. Each index server also has in its memory 204 the server program modules 210 that the server executes to perform the query processing and other operations performed by the server.

A shard of sessions 230 on an index server is a randomly selected subset of the universe of indexed sessions.

Figure 3:
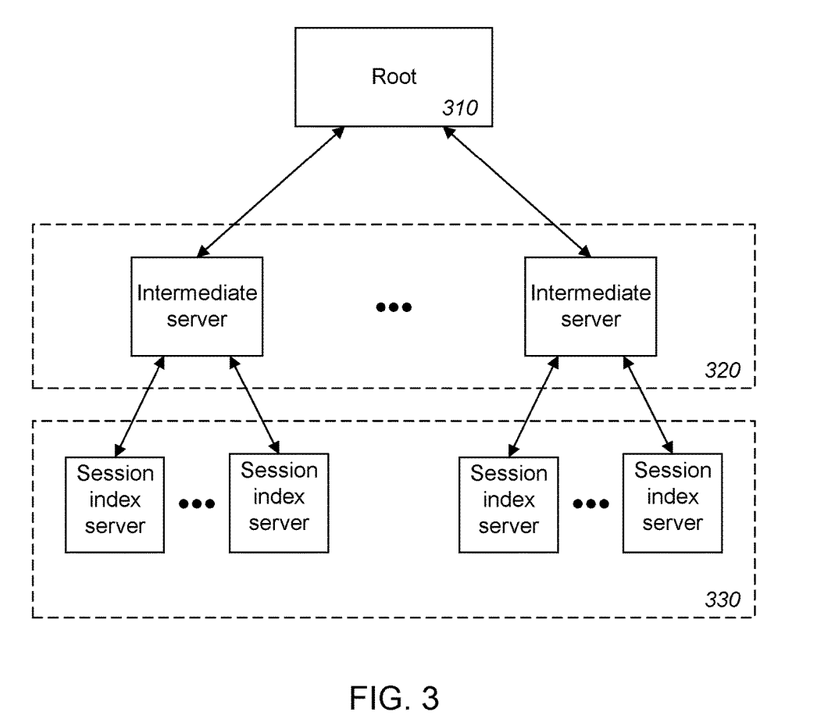
FIG. 3 illustrates a cluster of index servers having a root server, one or more layers of intermediate servers, and sessions index servers.

FIG. 3 illustrates a cluster 300 of index servers having a root server 310, one or more optional layers of intermediate servers 320, and sessions index servers 330 that are the leaf servers of the cluster. Each server in the cluster, including the root server, can have multiple replicas. Thus, for example, the same shard of index data and corresponding shard of session data can be assigned to a pool of multiple leaf servers. When a request is received, it will be assigned to and processed entirely by one of the leaf servers in the pool. Similarly, the work of any pool of intermediate servers or the work of a pool of root servers will be done by one of the servers in the pool. In a cluster with multiple root servers, the cluster can include a load balancer, e.g., a hardware-based load balancer, to monitor the root servers and perform local load balancing of requests across them. Load balancers can also be used to assign work to individual servers within other pools of servers.

Figure 4:
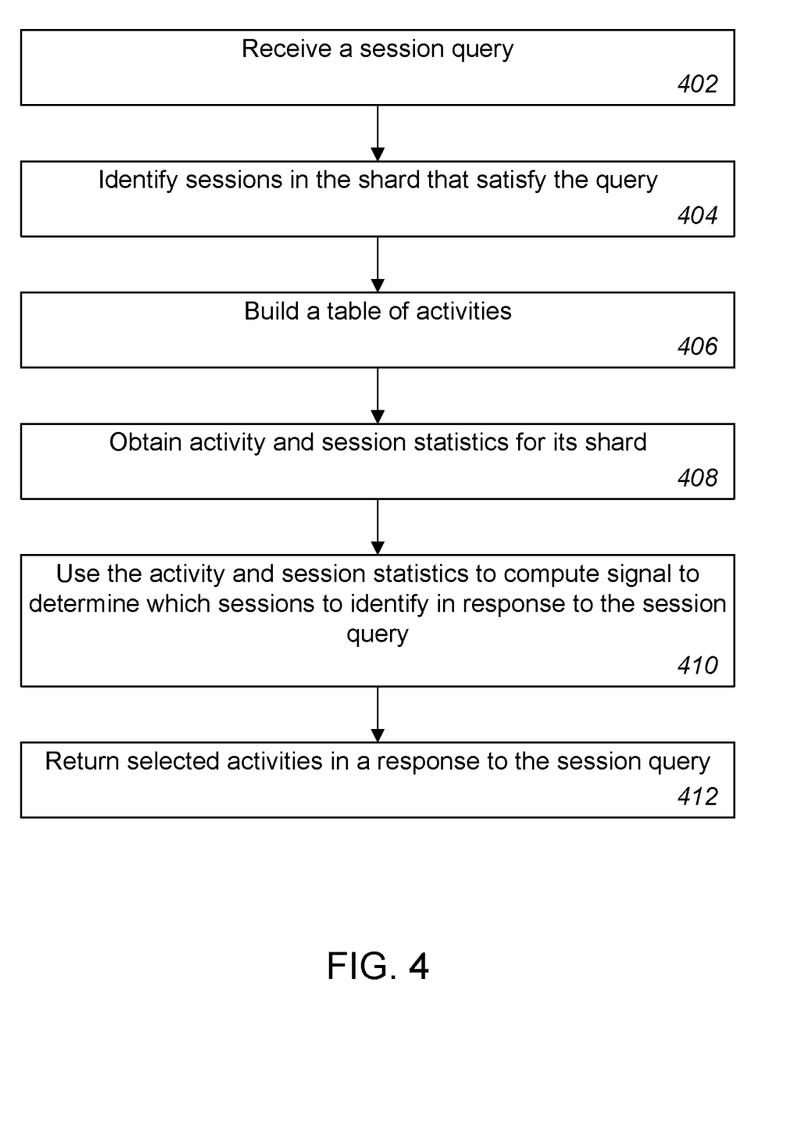
FIG. 4 is a flowchart of an example process executed by a session index server.

FIG. 4 is a flowchart of an example process executed by a session index server. Multiple instances of the process can be running on the server in parallel, processing different queries at the same time. If the server has multiple shards, each instance of the process operates on only one shard.

The process receives a session query (402). The session query includes one or more terms that each specify an attribute that a session might have. That is, query asks the server to identify sessions that include a particular user query, include a viewing of a particular video, include a viewing of a particular web page or a visit to a particular web site, belong to a user with a particular long-term interest, include an activity at a particular user location, and so on, or have some combination of session attributes. The terms can be connected with Boolean operators. In some implementations, the session query terms can be weighted. In some implementations, the session query may also include a requested activity type. For example, a query could include terms for sessions that include a search for Chinese restaurants in a particular city and a request for activities of the activity type "make a restaurant reservation."

The process identifies sessions in the shard that satisfy the query (404).

The process builds a table of activities (406) that occur in the sessions that satisfy the query, which may be referred to as the "matching" activities in the "matching" sessions.

Figure 5:
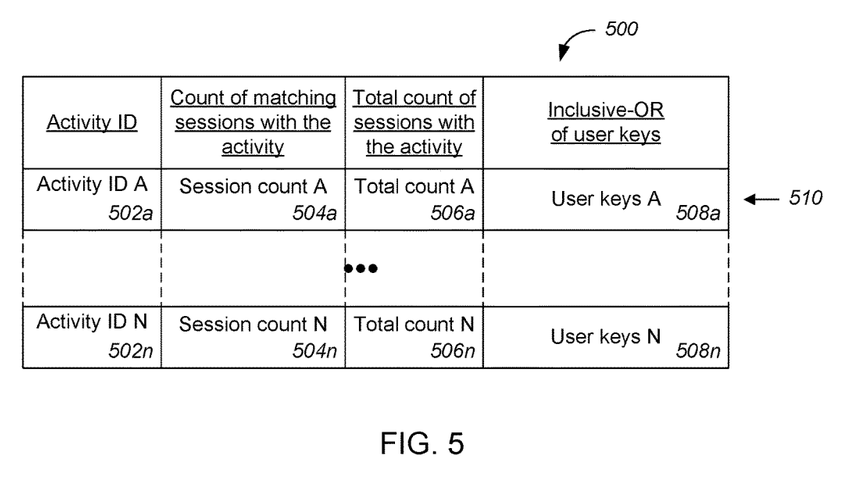
FIG. 5 illustrates an example structure of a table of activities.

FIG. 5 illustrates an example structure of a table of activities 500. Other table structures and other data structures can also be used to represent the same information.

Each activity has an entry in the table, e.g., entry 510 for an activity having activity ID A. Each activity that occurs in a session that satisfies the query has an entry. Each activity can be identified in the table by a unique activity ID (identifier) 502a, 502n. The process tabulates for each activity a count 504a, 504n of how many different matching sessions included the activity. In some implementations, an activity in a session is counted only once, even if it occurs multiple times in the session. In other implementations, an activity in a session may be counted each time it occurs, or it may be given a count for the session that is a function of the number of occurrences that reduces the impact of having many occurrences in one session, e.g., a logarithmic function. The process also records the total number of sessions 506a, 506n in the shard that include the activity. Finally, each entry includes a merged user key 508a, 508n, which is an inclusive-OR of the user keys of the matching sessions in which the activity 502a, 502n occurred.

The process obtains activity and session statistics for its shard (408). For each activity, the process has a count of how many sessions in the shard had the activity. This will be referred to as the total activity count for the shard for the activity. The process has a count of the number of sessions in its shard and the number of matching sessions in its shard.

The process uses the activity and session statistics to compute one or more signals to determine which sessions to identify in response to the session query (410). In some implementations, the process calculates a signal S that satisfies the following equation.

$$S = \frac{\text{(count of matching sessions with the activity/number of matching sessions)}}{\text{(count of all sessions with the activity/number of sessions)}}$$

The signal is calculated for each activity. The counts of matching sessions with the activity and of all sessions with the activity are illustrated in the second and third columns of FIG. 5, respectively.

The value S is used to determine which activities are returned by the process, i.e., which activities are identified in a response. In some implementations, only if S exceeds a threshold value is the activity identified in a response by the process. A higher value of S indicates a higher likelihood of the activity in question given a match to the session query input, compared to the likelihood of the activity over all sessions. In some cases, for rare activities, for example, if the activity occurred once in the sessions on the shard and is in a matching session, S will have a large value that may be spurious. In some implementations, such cases are handled as special cases; for example, the process can require that an activity occur a predetermined minimum number of times in the shard if it is to be included in a response. In some implementations, the value of S must be in a predetermined range of values for the activity to be identified in a response by the process, to reduce the likelihood of returning questionable activities. The threshold value or values of S can be selected empirically to limited the activities returned by the process to activities that are highly correlated—i.e., correlated to a high, desired degree of correlation—with the conditions specified by the session query.

In some implementations, each activity has a type, e.g., searching, viewing, or interests. If the session query requested activities of one or more particular types, only activities of the requested types are returned. In responding to session queries that have no requested types, the process can limit the number of activities identified for each type for which there are matching activities. The limit can be a predetermined number, e.g., no more than 10, 20, 50 or 100 activities. Each activity type can have a different limit. The process can select for each type those activities having the highest values of S.

In some implementations, the session query can specify that matching activities should be limited to activities that occur within a query-specified time window defined in reference to a session query term, which may include both time before and time after the occurrence in the session of the activity identified by the query term, or that matching activities must occur before or after an activity specified by the session query.

The process returns the selected activities in a response to the session query (412). For the activities that are selected to be included in the response, the process returns the following information in response to the session query: (i) for each activity, the count of how many matching sessions include the activity 504a, 504n, the count of all sessions that include the activity 506a, 506n, and the user key 508a, 508n; and (ii) the count of matching sessions. The total number of sessions in the relevant shard only needs to be provided once, or is already known to the parent server. This is the information needed to compute the signal S, described above.

In some implementations, the process also identifies in the response the matching sessions for each matching activity and, for each matching session, the location of the matching activity in the session.

Thus, the process identifies activities that are correlated with the conditions specified in the session search. With an appropriately selected threshold for the signal S, the process can be configured to identify highly-correlated activities. For example, if the session query identifies a particular search query, the process can return other queries that are highly-correlated with the particular query.

Figure 6:
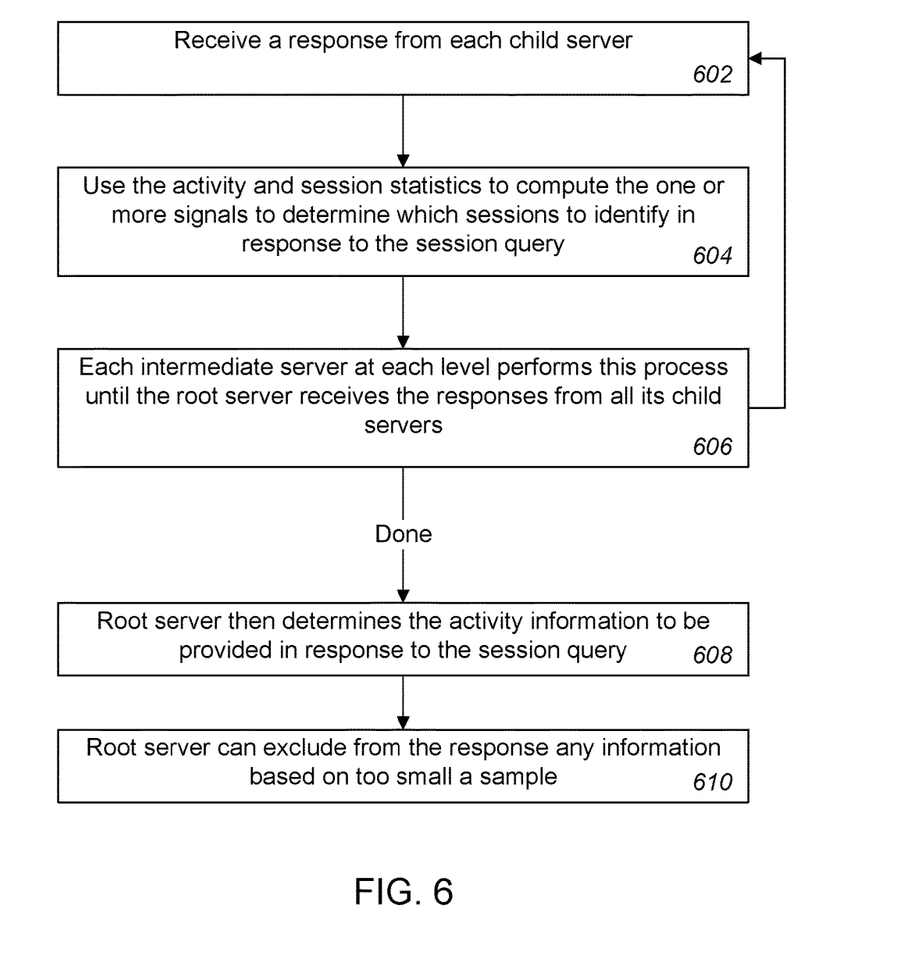
FIG. 6 is a flowchart of an example process executed by a parent server to process responses to a session query.

FIG. 6 is a flowchart of an example process executed by a parent server, i.e., an intermediate server or a root server, to process responses to a session query received from the child servers by the parent server. The parent server had previously submitted the session query to the child servers.

The process receives a response from each child server (602), which includes the information described above.

Because the sessions are partitioned among the leaf servers, the counts of matching activities, the counts of matching sessions, and the counts of sessions can simply be added together to yield a count of matching activities and a count of matching sessions and a count of sessions for the intermediate server. The user keys from each child server for each activity can be merged with an inclusive-OR of all the user keys.

This data can be used as described above to perform the operations of computing the signal S for each activity and identifying activities to include in a response to the parent server.

The process uses the activity and session statistics to compute the one or more signals to determine which sessions to identify in response to the session query (604), as described above in reference to FIG. 4. In some implementations, the process computes the signal S, as described above, for each activity responsive to the session query, from all the responses received from the child servers.

Each intermediate server at each level performs this process until the root server receives the responses from all its child servers (606).

The root server then determines the activity information to be returned in response to the session query (608). The returned information can include score information. For example, the returned information can include the scoring signal S, described above, as an activity score for each activity in the response. The returned information can also, or alternatively, include the values used to compute the scoring signal. The returned information can also, or alternatively, include activity scores based on S, e.g., the value of a squashing function of S, a lowest value of a confidence interval for S, or a highest value for a confidence interval for S.

The root server can exclude from the response any information based on too small a sample (610), in particular, on too small a number of distinct users or on too small a number of distinct sessions. Each merged user key received by the root server gives a lower bound on the number of distinct users represented in the matching sessions for the corresponding activity. The process in the root server can require that a minimum threshold number of bits be set in the merged user key before the process permits data from the corresponding activity to be returned in a response. Similarly, the process in the root server can require that a minimum threshold number of matching sessions be present before the process permits data from the corresponding activity to be returned in a response. Such steps would be taken to reduce the risk of information leaks arising from the use of data from too small a number of distinct users or too small a number of distinct sessions.

The root server can be implemented in a system environment that includes subsystems that identify spam, porn or other kinds of irrelevant or sensitive information, and, if so, can exclude from the response any activities or content that are identified as spam, porn, or otherwise irrelevant or sensitive information.

Figure 7:
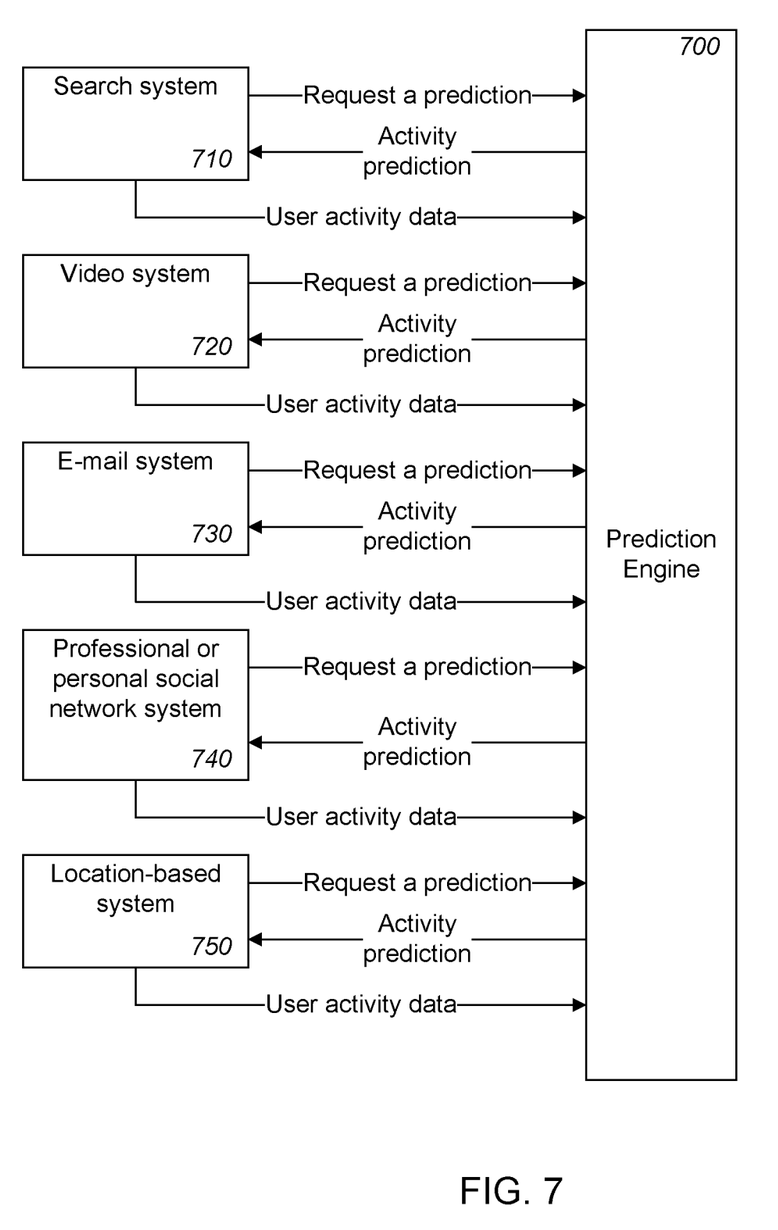
FIG. 7 illustrates a prediction engine in use with multiple kinds of systems providing interactive services to users.

FIG. 7 illustrates a prediction engine 700 as described above in use with multiple kinds of systems providing interactive services to users. Such systems can include, for example, a search system 710, e.g., an Internet search engine, a video system 720, e.g., a video sharing website, an e-mail system 730, e.g., a web-based e-mail system, a business-oriented or a personal social network system 740, e.g., a social networking web site, or a location-based system 750, e.g., a web site providing information tailored to a current user location, a map site, or a search system providing services to a mobile computer or smartphone based on the location of the user device. One or more of these systems can be integrated with each other or otherwise share information.

Each of the systems provides user activity data that collectively makes up the session data, which is partitioned into sessions, as described above. Each of the systems can request a prediction by submitting a query to the prediction engine 700. As described above, the query can include terms that identify a user activity or a user interest or both. In response to the query, the prediction engine can return one or more predictions. The predictions can include one or more activities, higher-level activities, or interests.

The prediction engine can be used in the following example scenarios.

In a first example scenario, a user opens his smartphone, and an application on the smartphone sends a query to the prediction engine. The query provides a user location, which may be based on GPS (Global Positioning System) data from the smartphone, for example, and, optionally, information about the user's interests. The prediction engine returns a set of points of interests and restaurants near the user location. The application presents information about the points of interest and restaurants to the user.

In a second example scenario, a user submits a query "wedding photographer" to a web search engine. The search engine requests a prediction, sending the same query as an activity of the user to the prediction engine. The prediction engine returns a set of tasks, e.g., "planning a wedding," and a set of interests, e.g., "romantic vacation." The search engine uses the response to suggest further queries or offer further content relevant to the tasks and interests.

In another example scenario, a search engine sends a query to the prediction engine identifying a set of interests of a user and a current search query. The prediction engine returns a response identifying a set of people the user may be interested in based on the interests and search query. The search engine computes ranking scores for its search results to boost the scores of people in the set.

In another example scenario, a search engine sends a query to the prediction engine identifying a search query submitted by a user and, for example, interests of the user or tasks recently engaged in by the user. The prediction engine returns a response identifying entities that the user may be interested in. The entities have a ranked order. The search engine responds to the search query with search results that include snippets, and includes in the snippets segments of text from the search result documents that refer to one or more highest ranking entities from the prediction engine response.

In another example scenario, a search engine sends a query to the prediction engine specifying a recent session history of a user. The prediction engine returns a set of content identifiers that similar users are interested in. The search engine suggests to the user that the user may be interested in one or more of the identified content items. The content items could be web resources, or, more specifically, social network site posts or blog posts, for example. In a variant of this scenario, the prediction engine returns a response identifying a set of services, e.g., restaurants, or products, e.g., home improvement supplies, that the user may be interested in.

In another example scenario, a social network system sends a query to the prediction engine specifying, e.g., a recent search query submitted by a user, or a video recently viewed by the user. The prediction engine returns a response identifying people with whom the user may interested in communicating at the current time.

In another example, a search engine sends a query to the prediction engine specifying that a user is currently interested in, e.g., searching for, entertainment activities or entertainment products, e.g., a music album, and further specifying interests, tasks, or activities, or a combination of them, associated with the user. The prediction engine returns a response identifying concerts similar users are buying tickets for, or albums similar users are buying.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages, and it can be deployed in any form, including as a stand-alone program or as a module, component, subroutine, or other unit suitable for use in a computing environment. A computer program can be deployed to be executed on one computer or on multiple computers that are located at one site or distributed across multiple sites and interconnected by a data communication network.

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. Generally, a computer will also include, or be operatively coupled to, one or more mass storage devices for storing data, e.g., magnetic, magneto-optical, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A prediction computer system comprising one or more computers and one or more storage devices storing instructions that are operable, when executed by the one or more computers, to cause the one or more computers to perform operations comprising:

receiving, by the prediction computer system, a query requesting one or more predicted activities that are likely to be performed by users having a particular attribute;

determining, by the prediction computer system, a plurality of matching sessions from user session data of a plurality of users, each matching session of the plurality of matching sessions being a user session for a user having the particular attribute of the query, wherein each user session for each user of the plurality of users includes data representing one or more user activities performed by the user during a particular time period, wherein the user session data is partitioned into a plurality of shards, each shard of the plurality of shards being stored on one of multiple index servers of the prediction computer system, wherein the index servers include a root server and a plurality of leaf servers;

computing, by the prediction computer system for each activity of a plurality of activities represented in the matching sessions, a respective lower bound of a number of distinct users having data contributing to the activity in the matching sessions for the activity, wherein computing a lower bound for an activity comprises:

hashing, by each leaf server for each matching session, a portion of a respective user identifier associated with the matching session to generate one or more user key positions for the matching session, generating, by each leaf server for each activity of one or more activities occurring in the matching sessions stored in the shard assigned to the leaf server, a respective merged user key for the activity including setting each position in the merged user key indicated by any user key position generated for matching sessions having the activity, generating, by the root server for each activity of one or more activities occurring in the matching sessions, an overall merged user key for the activity including setting each position in the overall merged user key indicated by any set position in any merged user key received from the leaf servers for matching sessions having the activity, and computing, by the root server for each activity of one or more activities occurring in the matching sessions, a count of positions that are set in the overall merged user key for the activity;

computing, by the prediction computer system, for each user activity of one or more activities having a lower bound that satisfies a threshold:

a respective first score representing a likelihood that the user activity occurs in the plurality of matching sessions;

a respective second score representing a likelihood that the user activity occurs in any of the user sessions of the user session data;

a respective third score that measures a relative magnitude of the first score compared to the second score;

designating, as the one or more predicted activities, one or more of the user activities having a third score that satisfies a threshold; and providing, by the prediction computer system and based on the designation of the one or more user activities as the one or more predicted activities, data representing a respective predicted activity for each of the one or more predicted activities.

2. The prediction computer system of claim 1, wherein the operations further comprise preventing information leaks of information that occurs in less than a minimum number of sessions or for less than a minimum number of users.

3. The prediction computer system of claim 1, wherein the operations further comprise organizing user activity data into a plurality of sessions, each session including data representing one or more user activities of a single respective user, the sessions including sessions for multiple users.

4. The prediction computer system of claim 3, wherein organizing the user activity data into the plurality of sessions comprises organizing the user activity data into sessions representing non-overlapping time periods of a fixed, predetermined duration.

5. The prediction computer system of claim 3, wherein the prediction computer system is one subsystem in an environment having multiple subsystems, wherein organizing the user activity data into the plurality of sessions comprises receiving, from another subsystem of the multiple subsystems, data representing user activities performed within the other subsystem, and wherein receiving the a query requesting predicted activities comprises receiving the query from the other subsystem.

6. The prediction computer system of claim 5, wherein the other subsystem comprises an email subsystem, a social networking subsystem, a video sharing subsystem, or a search engine subsystem.

7. A computer-implemented method comprising:

receiving, by a prediction computer system, a query requesting predicted activities that are likely to be performed by users having a particular attribute;

determining, by the prediction computer system, a plurality of matching sessions from user session data of a plurality of users, each matching session of the plurality of matching sessions being a user session for a user having the particular attribute of the query, wherein each user session for each user of the plurality of users includes data representing one or more user activities performed by the user during a particular time period, wherein the user session data is partitioned into a plurality of shards, each shard of the plurality of shards being stored on one of multiple index servers of the prediction computer system, wherein the index servers include a root server and a plurality of leaf servers;

computing, by the prediction computer system for each activity of a plurality of activities represented in the matching sessions, a respective lower bound of a number of distinct users having data contributing to the activity in the matching sessions for the activity, wherein computing a lower bound for an activity comprises:

hashing, by each leaf server for each matching session, a portion of a respective user identifier associated with the matching session to generate one or more user key positions for the matching session, generating, by each leaf server for each activity of one or more activities occurring in the matching sessions stored in the shard assigned to the leaf server, a respective merged user key for the activity including setting each position in the merged user key indicated by any user key position generated for matching sessions having the activity, generating, by the root server for each activity of one or more activities occurring in the matching sessions, an overall merged user key for the activity including setting each position in the overall merged user key indicated by any set position in any merged user key received from the leaf servers for matching sessions having the activity, and computing by the root server for each activity of one or more activities occurring in the matching sessions, a count of positions that are set in the overall merged user key for the activity;

computing, by the prediction computer system, for each user activity of one or more activities having a lower bound that satisfies a threshold:

a respective first score representing a likelihood that the user activity occurs in the plurality of matching sessions;

a respective second score representing a likelihood that the user activity occurs in any of the user sessions of the user session data;

a respective third score that measures a relative magnitude of the first score compared to the second score;

designating, as the one or more predicted activities, one or more of the user activities having a third score that satisfies a threshold; and providing, by the prediction computer system and based on the designation of the one or more user activities as the one or more predicted activities, data representing a respective predicted activity for each of the one or more predicted activities.

8. The method of claim 7, further comprising preventing information leaks of information that occurs in less than a minimum number of sessions or for less than a minimum number of users.

9. The method of claim 7, further comprising organizing user activity data into a plurality of sessions, each session including data representing one or more user activities of a single respective user, the sessions including sessions for multiple users.

10. The method of claim 9, wherein organizing the user activity data into the plurality of sessions comprises organizing the user activity data into sessions representing non-overlapping time periods of a fixed, predetermined duration.

11. The method of claim 9, wherein the prediction computer system is one subsystem in an environment having multiple subsystems,
wherein organizing the user activity data into the plurality of sessions comprises receiving, from another subsystem of the multiple subsystems, data representing user activities performed within the other subsystem, and
wherein receiving the a query requesting predicted activities comprises receiving the query from the other subsystem.

12. The method of claim 11, wherein the other subsystem comprises an email subsystem, a social networking subsystem, a video sharing subsystem, or a search engine subsystem.

13. A computer program product, encoded on one or more non-transitory computer storage media, comprising instructions that when executed by one or more computers of a prediction computer system cause the one or more computers to perform operations comprising:
receiving, by the prediction computer system, a query requesting predicted activities that are likely to be performed by users having a particular attribute;
determining, by the prediction computer system, a plurality of matching sessions from user session data of a plurality of users, each matching session of the plurality of matching sessions being a user session for a user having the particular attribute of the query, wherein each user session for each user of the plurality of users includes data representing one or more user activities performed by the user during a particular time period,
wherein the user session data is partitioned into a plurality of shards, each shard of the plurality of shards being stored on one of multiple index servers of the prediction computer system, wherein the index servers include a root server and a plurality of leaf servers;
computing, by the prediction computer system for each activity of a plurality of activities represented in the matching sessions, a respective lower bound of a number of distinct users having data contributing to the activity in the matching sessions for the activity,
wherein computing a lower bound for an activity comprises:
hashing, by each leaf server for each matching session, a portion of a respective user identifier associated with the matching session to generate one or more user key positions for the matching session,
generating, by each leaf server for each activity of one or more activities occurring in the matching sessions stored in the shard assigned to the leaf server, a respective merged user key for the activity including setting each position in the merged user key indicated by any user key position generated for matching sessions having the activity,
generating, by the root server for each activity of one or more activities occurring in the matching sessions, an overall merged user key for the activity including setting each position in the overall merged user key indicated by any set position in any merged user key received from the leaf servers for matching sessions having the activity, and
computing by the root server for each activity of one or more activities occurring in the matching sessions, a count of positions that are set in the overall merged user key for the activity;
computing, by the prediction computer system, for each user activity of one or more activities having a lower bound that satisfies a threshold:
a respective first score representing a likelihood that the user activity occurs in the plurality of matching sessions;
a respective second score representing a likelihood that the user activity occurs in any of the user sessions of the user session data;
a respective third score that measures a relative magnitude of the first score compared to the second score;
designating, as the one or more predicted activities, one or more of the user activities having a third score that satisfies a threshold; and
providing, by the prediction computer system and based on the designation of the one or more user activities as the one or more predicted activities, data representing a respective predicted activity for each of the one or more predicted activities.

14. The computer program product of claim 13, wherein the operations further comprise preventing information leaks of information that occurs in less than a minimum number of sessions or for less than a minimum number of users.

15. The computer program product of claim 13, wherein the operations further comprise organizing user activity data into a plurality of sessions, each session including data representing one or more user activities of a single respective user, the sessions including sessions for multiple users.

16. The computer program product of claim 15, wherein organizing the user activity data into the plurality of sessions comprises organizing the user activity data into sessions representing non-overlapping time periods of a fixed, predetermined duration.

17. The computer program product of claim 15, wherein the prediction computer system is one subsystem in an environment having multiple subsystems,
wherein organizing the user activity data into the plurality of sessions comprises receiving, from another subsystem of the multiple subsystems, data representing user activities performed within the other subsystem, and
wherein receiving the a query requesting predicted activities comprises receiving the query from the other subsystem.

18. The computer program product of claim 17, wherein the other subsystem comprises an email subsystem, a social networking subsystem, a video sharing subsystem, or a search engine subsystem.

* * * * *

UNITED STATES PATENT AND TRADEMARK OFFICE
CERTIFICATE OF CORRECTION

PATENT NO.         : 10,169,711 B1
APPLICATION NO.    : 15/277306
DATED              : January 1, 2019
INVENTOR(S)        : Dean Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 128 days.

Signed and Sealed this
Sixteenth Day of July, 2019

Andrei Iancu
*Director of the United States Patent and Trademark Office*